United States Patent
Asmus et al.

(10) Patent No.: US 11,042,924 B2
(45) Date of Patent: Jun. 22, 2021

(54) BUILDING CONTROLLER FOR OPTIMIZING EQUIPMENT UPGRADES WITH DESIGN OF EXPERIMENTS

(71) Applicant: Johnson Controls Technology Company, Plymouth, MI (US)

(72) Inventors: Matthew J. Asmus, Watertown, WI (US); Graeme Willmott, West Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 496 days.

(21) Appl. No.: 15/456,180

(22) Filed: Mar. 10, 2017

(65) Prior Publication Data

US 2018/0259918 A1     Sep. 13, 2018

(51) Int. Cl.
  *G06Q 30/06* (2012.01)
  *G05B 15/02* (2006.01)

(52) U.S. Cl.
  CPC ........ *G06Q 30/0633* (2013.01); *G05B 15/02* (2013.01)

(58) Field of Classification Search
  CPC .................................................. G06Q 50/06
  See application file for complete search history.

(56) References Cited

U.S. PATENT DOCUMENTS

| | | | |
|---|---|---|---|
| 5,809,282 A * | 9/1998 | Cooper | H04L 41/0823 700/49 |
| 8,903,554 B2 | 12/2014 | Stagner | |
| 2003/0176938 A1 * | 9/2003 | Tuszynski | G05B 19/41865 700/97 |
| 2011/0276514 A1 * | 11/2011 | Kalagnanam | G06Q 10/06 705/348 |
| 2013/0275263 A1 * | 10/2013 | Carlin, Jr. | G06Q 50/06 705/26.8 |
| 2015/0192317 A1 | 7/2015 | Asmus | |
| 2015/0241856 A1 | 8/2015 | Walser et al. | |
| 2015/0316902 A1 | 11/2015 | Wenzel et al. | |
| 2015/0316903 A1 | 11/2015 | Asmus et al. | |

(Continued)

OTHER PUBLICATIONS

U.S. Appl. No. 14/971,813, filed Dec. 16, 2015, Johnson Controls Technology Company.

(Continued)

*Primary Examiner* — James J Lee
*Assistant Examiner* — Shon G Foley
(74) *Attorney, Agent, or Firm* — Foley & Lardner LLP

(57) ABSTRACT

A building management includes building equipment operable to affect a variable state or condition of a building and a controller. The controller is configured to identify one or more facility improvement measures (FIMS), each of the FIMS representing a potential upgrade or addition to the building equipment. The controller is further configured to perform a design of experiments analysis to determine a plurality of combinations of the FIMS, each combination including one or more of the FIMS and a level for each FIM in the combination. The controller is configured to generate an objective function based on the combinations of the FIMS. The objective function indicates an economic value as a function of the FIMS and optimize the objective function to determine an optimal combination of the FIMS.

19 Claims, 9 Drawing Sheets

(56) References Cited

U.S. PATENT DOCUMENTS

2016/0209852 A1  7/2016  Beyhaghi et al.

OTHER PUBLICATIONS

U.S. Appl. No. 15/387,512, filed Dec. 21, 2016, Johnson Controls Technology Company.
U.S. Appl. No. 15/426,962, filed Feb. 1, 2017, Johnson Controls Technology Company.
Rao, Engineering Optimization, Theory and Practice, 4th s.l.; John Wiley and Sons, 2009.
Seltman, Experimental Design and Analysis, 2015.
Telford, A Brief Introduction to Design of Experiments. Johns Hopkins APL Technical Digest, vol. 27, Nov. 2007, 3, Baltimore : s.n.
Weisburg, Applied Linear Regression. Hoboken, John Wiley and Sons, 2005. 9780471663799.
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
Diederik Kingma and Jimmy Ba. Adam: A Method for Stochastic Optimization. In International Conference on Learning Representations (ICLR), 2015, 15 pages.
George EP Box, Gwilym M Jenkins, Gregory C Reinsel, and Greta M Ljung. Time Series Analysis: Forecasting and Control. John Wiley & Sons, 2015, chapters 13-15. 82 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

* cited by examiner

| B1 | C1 | C2 | Y1 |
|---|---|---|---|
| Low | Low | Low | Value 1 |
| | | Medium | Value 2 |
| | | High | Value 3 |
| | High | Low | Value 4 |
| | | Medium | Value 5 |
| | | High | Value 6 |
| Low | Low | Low | Value 7 |
| | | Medium | Value 8 |
| | | High | Value 9 |
| | High | Low | Value 10 |
| | | Medium | Value 11 |
| | | High | Value 12 |

900 →

| Tank Size | Year | Chiller Size | Operating Cost |
|---|---|---|---|
| | | *902* *904* *906* *908* | |
| Small | Small | Small | $9,000,280 |
| | | Medium | $8,923,232 |
| | | Large | $8,871,982 |
| | Medium | Small | $11,078,672 |
| | | Medium | $10,977,802 |
| | | Large | $10,898,149 |
| | Large | Small | $13,843,466 |
| | | Medium | $13,679,876 |
| | | Large | $13,567,541 |
| Medium | Small | Small | $8,982,402 |
| | | Medium | $8,908,511 |
| | | Large | $8,859,694 |
| | Medium | Small | $11,054,681 |
| | | Medium | $10,957,230 |
| | | Large | $10,881,932 |
| | Large | Small | $13,825,434 |
| | | Medium | $13,825,434 |
| | | Large | $13,561,209 |
| Large | Small | Small | $8,978,763 |
| | | Medium | $8,908,058 |
| | | Large | $8,855,599 |
| | Medium | Small | $11,050,896 |
| | | Medium | $10,953,707 |
| | | Large | $10,878,733 |
| | Large | Small | $13,820,137 |
| | | Medium | $13,653,829 |
| | | Large | $13,557,636 |

FIG. 9

BUILDING CONTROLLER FOR OPTIMIZING EQUIPMENT UPGRADES WITH DESIGN OF EXPERIMENTS

BACKGROUND

A building, facility, or central plant includes various types of equipment. The equipment may be used to heat the building, cool the building, store energy, etc. The equipment may include chillers, air handler units, boilers, thermal energy storage units, and any other piece of equipment that can be used in a building, facility, or central plant. The equipment may be available for purchase in various sizes, various capacities, with various software options, with various equipment upgrades, etc. There may be a large number of possible purchase options for a single piece of equipment. Further, when determining to purchase multiple pieces of building equipment, the number of possible purchases may become very large.

When considering upgrades for building equipment, known as facility improvement measures (FIMS), a large number of possible selections can be made regarding the equipment. Each selection may correspond to one potential upgrade that can be made. In some cases, the number of possible selections is infinite (e.g., if there is no limit to the number of potential sizes that can be selected). If multiple equipment selections are considered concurrently, the number of possible combinations of equipment selections may be exponentially larger than the number of possible selections.

In conventional systems, each potential combination of equipment upgrades is evaluated (e.g., by a controller or building management system) and compared to the other potential combinations to determine which combination is predicted to optimize the performance of the building or facility. However, when the number of potential combinations is large, determining the optimal upgrades and/or building equipment purchases may take a long time and/or may be impossible to determine by brute force.

SUMMARY

One implementation of the present disclosure is a building management system. The building management system includes building equipment operable to affect a variable state or condition of a building and a controller. The controller is configured to identify one or more facility improvement measures (FIMS), each of the FIMS representing a potential upgrade or addition to the building equipment. The controller is further configured to perform a design of experiments analysis to determine a plurality of combinations of the FIMS, each combination includes one or more of the FIMS and a level for each FIM in the combination. The controller is configured to generate an objective function based on the combinations of the FIMS. The objective function indicates an economic value as a function of the FIMS and optimize the objective function to determine an optimal combination of the FIMS.

In some embodiments, the FIMS determined by the controller include each possible combination of each FIM and each FIM level. The controller can be configured to select one or more levels for each FIM based on an output response of the FIM.

In some embodiments, the controller is configured to determine an output response for each FIM. The output response may indicate a type of relationship between the FIM and an operating cost resulting from the FIM. The controller can be configured to select two distinct levels for a particular FIM in response to determining that the output response of the particular FIM is binary, select two distinct levels for the particular FIM in response to determining that the output response of the particular FIM is linear, and select three distinct levels for the particular FIM in response to determining that the output response of the particular FIM is quadratic.

In some embodiments, the controller is configured to generate a baseline model based on information associated with the building equipment. The baseline model may represent an operating cost of the building equipment prior to implementing the FIMS.

The controller can be configured to generate the objective function based on an operating expense model of the FIMS. The operating expense model can represent an operating cost of the FIMS. In some embodiments, the controller is configured to generate the operating expense model by determining an operating cost for each combination of the FIMS and performing a regression with the operating costs.

In some embodiments, the controller is configured to generate an operating expense model for each of the combinations of the FIMS. The operating expense model may indicate a cost of operating the building equipment after implementing the FIMS.

In some embodiments, the controller is configured to generate a baseline model that indicates a cost of operating the building equipment prior to implementing the FIMS and determine a benefit of each of the combinations of the FIMS based on a difference between the cost indicated by the baseline model and the cost indicated by the operational expense model.

In some embodiments, the controller is configured to determine a capital expense function for each of the FIMS and generate a capital expense model by summing each of the capital expense functions. The capital expense model may represent a purchase cost of the FIMS.

The controller can be configured to generate the objective function further based on a capital expense model and an operating expense model. The capital expense model may represent a purchase cost of the FIMS and the operating expense model represents an operating cost of the FIMS.

In some embodiments, the objective function is a net present value (NPV) function. The difference between the baseline model and the operating expense model and the capital expense model may be arguments in the NPV function. In some embodiments, the controller is configured to optimize the NPV function to identify FIMS which result in an optimal NPV or internal rate of return (IRR).

Another implementation of the present disclosure is a method for optimizing upgrades to building equipment in a building management system. The method includes identifying one or more facility improvement measures (FIMS), each of the FIMS representing a potential upgrade or addition to the building equipment. The building equipment is operable to affect a variable state or condition of a building. The method further includes performing a design of experiments analysis to determine a plurality of combinations of the FIMS, each combination includes one or more of the FIMS and a level for each FIM in the combination. The method includes generating an objective function based on the combinations of the FIMS. The objective function indicates an economic value as a function of the FIMS and optimizing the objective function to determine an optimal combination of the FIMS.

In some embodiments, the combinations of the FIMS includes each possible combination of each FIM and each FIM level. The method may further include selecting one or more levels for each FIM based on an output response of the FIM.

In some embodiments, the method further includes determining an output response for each FIM. The output response may indicate a type of relationship between the FIM and an operating cost resulting from the FIMS. The method may include selecting two distinct levels for a particular FIM in response to determining that the output response of the FIM is binary, selecting two distinct levels for the particular FIM in response to determining that the output response of the FIM is linear, and selecting three distinct levels for the particular FIM in response to determining that the output response of the FIM is quadratic.

The method may further include generating a baseline model based on information associated with the building equipment. The baseline model may represent an operating cost of the building equipment prior to implementing the FIMS.

In some embodiments, generating the objective function is based on an operating expense model of the FIMS. The operating expense model may represent an operating cost of the FIMS. In some embodiments, the method further includes generating the operating expense model by determining an operating cost for each combination of the FIMS and performing a regression with the operating costs.

In some embodiments, the method further includes generating a baseline model that predicts a cost of operating the building equipment prior to implementing the FIMS and determining a benefit of each of the combinations of the FIMS based on a difference between the cost predicted by the baseline model and the cost predicted by the operational expense model.

In some embodiments, the generating the objective function is further based on a capital expense model and an operating expense model. The capital expense model may represent a purchase cost of the FIMS and the operating expense model represents an operating cost of the FIMS. In some embodiments, the method further includes generating the capital expense model by determining a capital expense function for each of the combinations of the FIMS and summing each of the capital expense functions.

In some embodiments, the objective function is a net present value (NPV) function and the difference between the baseline model and the operating expense model and the capital expense are arguments in the NPV function. In some embodiments, the method further includes optimizing the NPV function to identify FIMS which result in an optimal NPV or internal rate of return (IRR).

Another implementation of the present disclosure is a building management system. The building management system includes building equipment operable to affect a variable state or condition of a building and a controller. The controller is configured to identify one or more facility improvement measures (FIMS), each of the FIMS representing a potential upgrade or addition to the building equipment and perform a design of experiments analysis to determine a plurality of combinations of the FIMS, the combinations of the FIMS includes each possible combination of the FIMS and one or more levels for each FIM. The controller is further configured to determine an output response for each FIM. The output response indicates a type of relationship between the FIM and an operating cost resulting from the FIMS and select the one or more levels for each FIM in the combinations based on the output response. The controller is further configured to generate a baseline model that predicts a cost of operating the building equipment prior to implementing any of the FIMS. The controller is configured to generate the operating expense model by determining an operating cost for each combination of the FIMS and performing a regression with the operating costs. The operating expense model represents an operating cost of the FIMS and generate a capital expense model. The capital expense model represents a purchase cost of the FIMS. The controller is further configured to generate an objective function based on the baseline model, the operating expense model, and the capital expense model. The objective function indicates an economic value for the FIMS and optimize the objective function to determine an optimal combination of the FIMS.

In some embodiments, the controller is configured to select two distinct levels for a particular FIM in the combination in response to determining that the output response of the FIM is binary. The controller can be configured to select two distinct levels for the particular FIM in the combination in response to determining that the output response of the FIM is linear and select three distinct levels for the particular FIM in the combination in response to determining that the output response of the FIM is quadratic.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 9 is an example of FIMS, FIM levels, FIM level combinations, and an operating cost for each FIM level combination that can be determined by the building controller of FIGS. 4 and 6-7, according to an exemplary embodiment.

DETAILED DESCRIPTION

Overview

Referring generally to the FIGURES, systems and methods for determining equipment upgrades for a building with a building controller utilizing design of experiments are shown, according to various exemplary embodiments. The building controller may be configured to use the design of experiments method to efficiently and effectively determine what improvements should be made to a facility and/or building. An upgrade to a facility or building may have a large number of possible sizes and/or selections. For example, when considering to upgrade a thermal energy storage (TES) tank, a large number of possible tank sizes must be considered. In addition to the TES tank upgrade, a second upgrade may be simultaneously considered which may be upgrading the size of a chiller. Again the number of various sizes for a chiller may be large. Further, a third upgrade to a facility may be the purchase of variable speed drives (VSDS) for compressors of the building.

The most effective way for the building controller to select an optimal TES tank size, a chiller size, and whether or not to purchase VSDS for compressors of the building is to analyze the upgrades in combination rather than in isolation. However, when analyzing the various upgrades in combination, the number of possible upgrade selections becomes exponentially large. For example, if there are 100 different TES tank sizes, 600 different chiller sizes, and 2 selections for the VSDS, this means there are 100*600*2=120,000 different possible combinations to consider. Having a controller exhaustively test all 120,000 different possible combinations is not efficient and may take a long time (e.g., a predefined number of processor cycles).

A building controller may use design of experiments to appropriately model the upgrades or improvements rather than exhaustively test each combination of each size and level of each upgrade or improvement. By using design of experiments, the building controller can select a predefined amount of levels to test and generate models for the equipment upgrades based on the selected levels. This may allow the building controller to determine optimal equipment upgrades faster (e.g., with less processor cycles) than exhaustively testing each possible combination of equipment upgrades.

Building Management System and HVAC System

Figure 1:
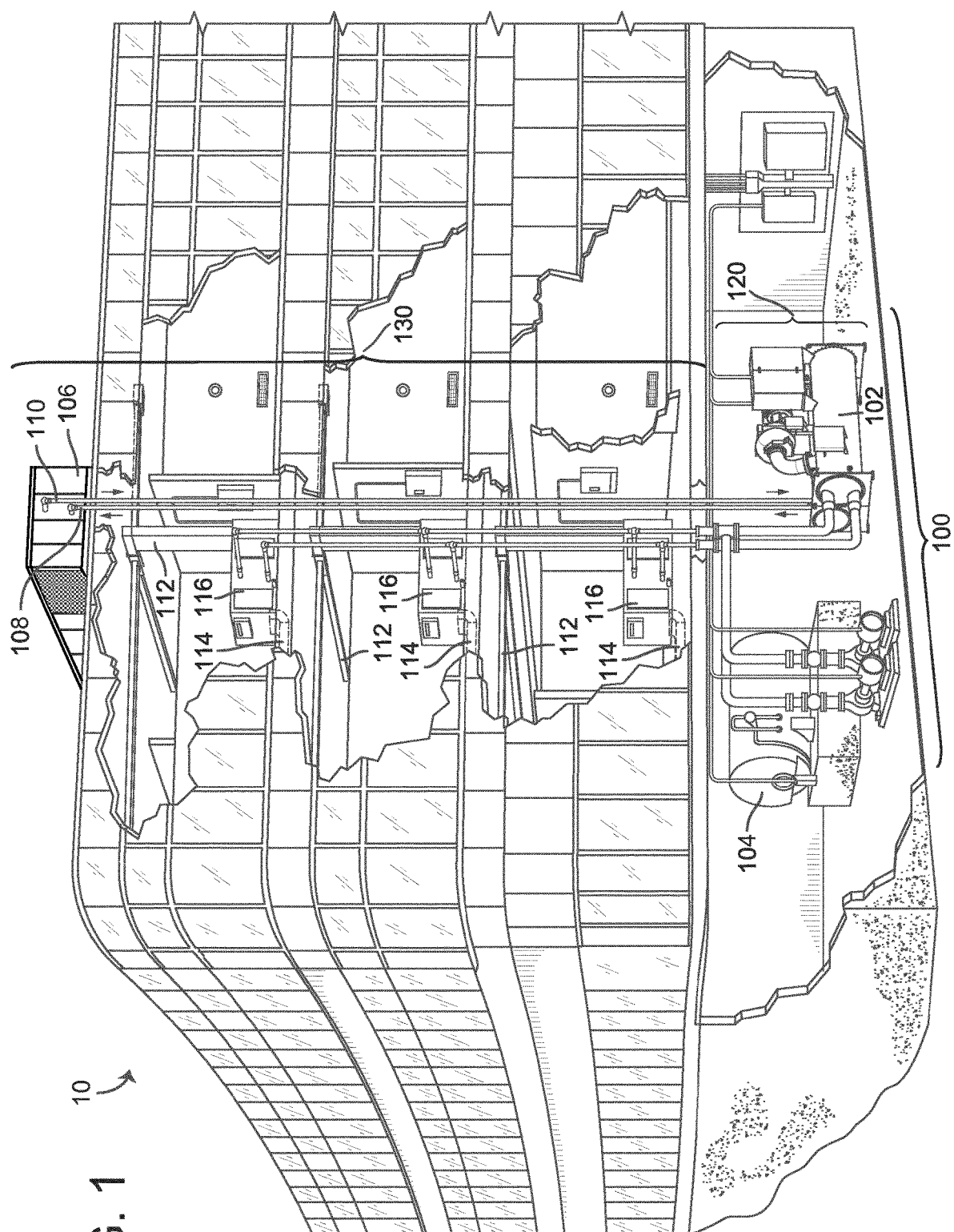
FIG. 1 is a drawing of a building equipped with a HVAC system, according to an exemplary embodiment.
Figure 2:
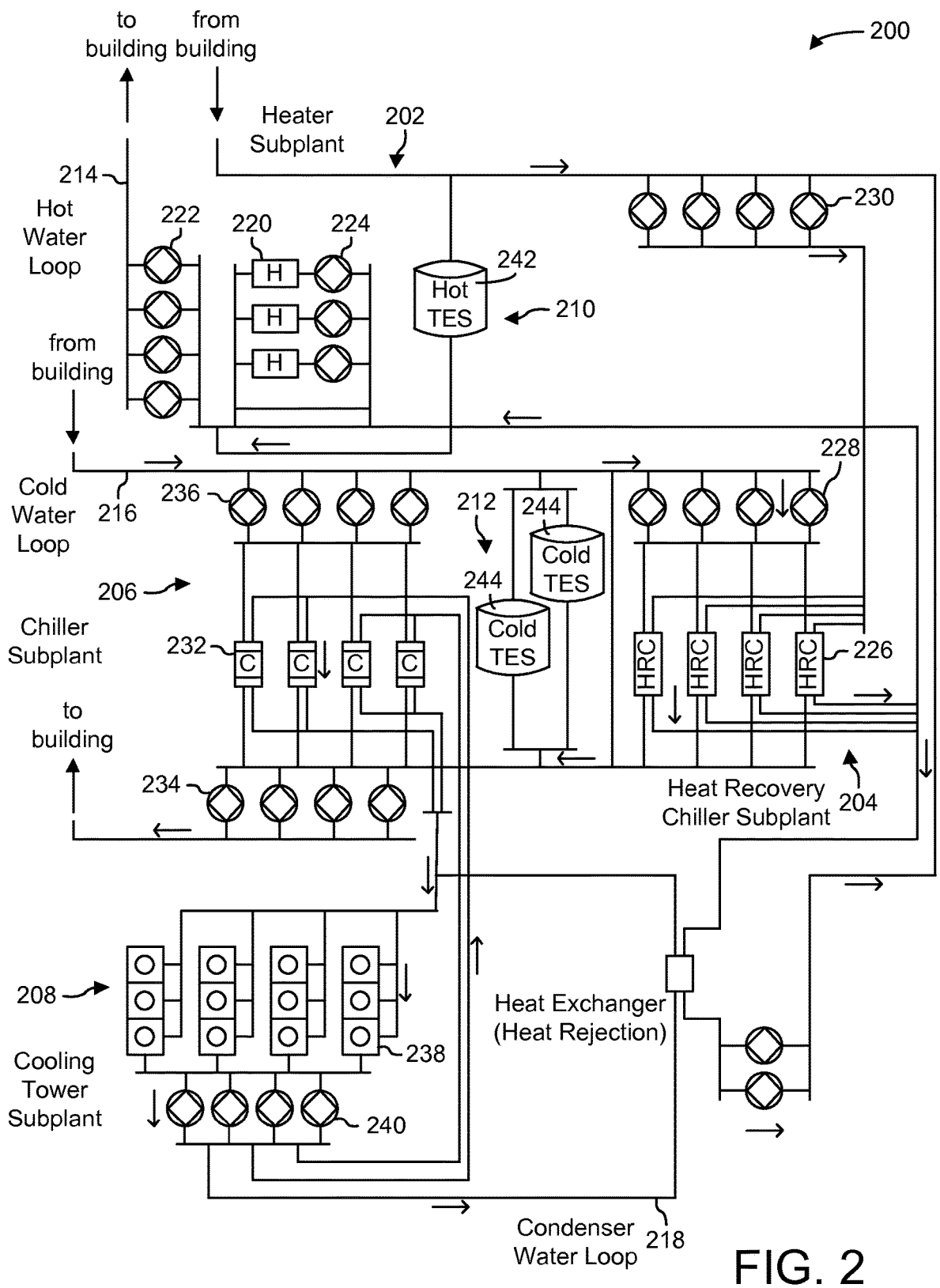
FIG. 2 is a block diagram of a waterside system that may be used in conjunction with the building of FIG. 1, according to an exemplary embodiment.
Figure 3:
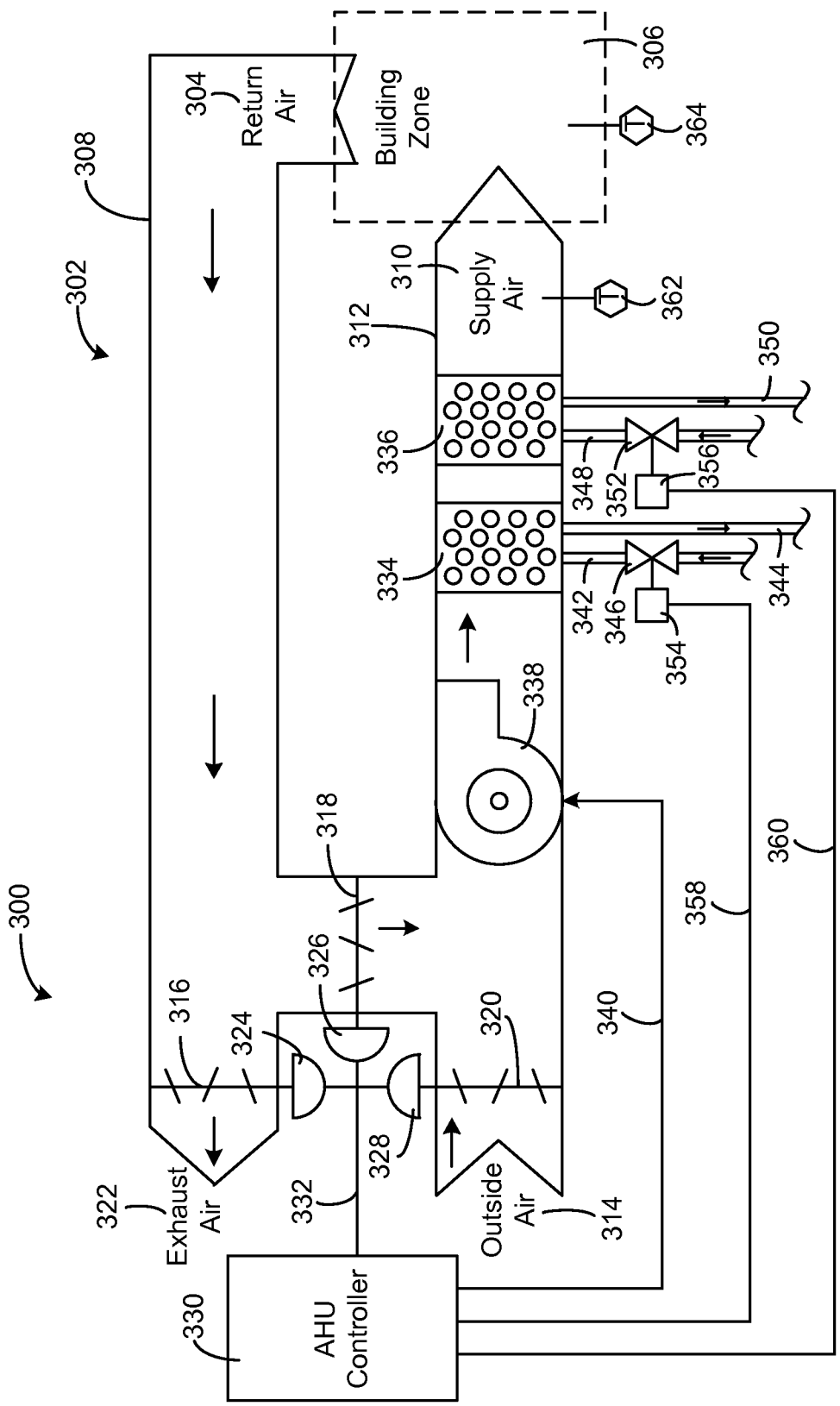
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Systems and Methods for Optimizing Building Equipment

Figures 4, 5:
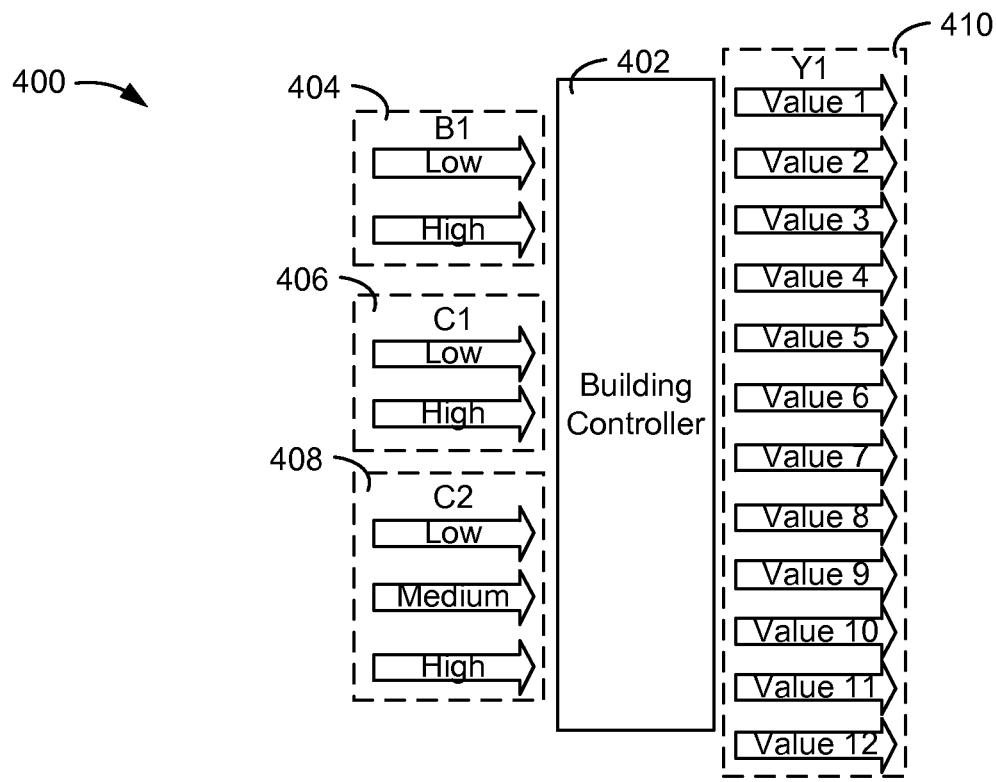
FIG. 4 is a block diagram of a building controller generating outputs from inputs with design of experiments, according to an exemplary embodiment.
FIG. 5 is a table of the inputs and the outputs of FIG. 4, according to an exemplary embodiment.

Referring now to FIG. 4, a system 400 is shown using design of experiments to generate one or more outputs from one or more inputs. System 400 is shown to include a building controller 402. Building controller 402 can be a computer system (e.g., one or more processors coupled to one or more memory devices). In some embodiments, building controller 402 is a computer system and/or controller running METASYS®, VERASYS®, and/or other building management software. In some embodiments, building controller 402 is at least one of or a combination of a controller, a thermostat, a sensor, and/or an actuator that can process data. In some embodiments, building controller 402 is a Network Automation Engine (NAE), a Network Integration Engine (NIE), an Advanced Field Equipment Controller (FAC), a Network Control Engine (NCE) and/or any other network engine and/or controller. In various embodiments, building controller 402 is a laptop computer, a desktop computer, a server, and/or any other computing device.

Building controller 402 may be a building controller for a building (e.g., building 10), a campus, a facility, a central plant, etc. In some embodiments, building controller 402 is located in a building such as an office, a school, a factory, a hospital, etc. where building controller 402 may be configured to control an environmental condition such as temperature or humidity among performing other functions. In various embodiments, building controller 402 may be a building controller for a central plant. The central plant may serve one or more buildings by heating and/or cooling the buildings. When referred to herein, "building," "facility," or "building or facility," may refer to any building, a facility, or central plant.

Building controller 402 is shown to use inputs B1 404, C1 406, and C2 408. The inputs B1 404, C1 406, and C2 408 may be inputs to a process or inputs used to generate a model by building controller 402. In some embodiments, inputs B1 404, C1 406, and C2 408 are generated by building controller 402. For example, building controller 402 may be configured to determine one or more equipment upgrades for a building or facility. These upgrades may be FIMS. FIMS may be purchases of various equipment and/or software. For example FIMS may include, software purchases (e.g., METASYS®), various equipment upgrades or add-ons (e.g., a variable speed drive), increasing a tank size for and/or purchasing TES and/or a TES tank, increasing the size of and/or purchasing a new boiler, increasing the size of and/or purchasing a new chiller, etc. Building controller 402 may identify three possible FIMS, B1 404, C1 406, and C2 408 which may correspond to possible equipment and/or software updates. Input B1 404 may correspond to the purchase of a variable speed drive for a compressor of a building or facility, C1 406 may correspond to a tank size of a TES, while C2 408 may correspond to chiller size of a chiller. Building controller 402 is further shown to generate output Y1 410. Y1 410 may be a particular operating expense or a model of operating expenses based on the three FIMS, B1 404, C1 406, and C2 408.

Building controller 402 can select a finite amount of levels for each input. In some embodiments, building controller 402 may identify and/or predict the effect which an input, B1 404, C1 406, and/or C2 408 will have on output Y1 410. If the effect the input will have on the output is linear, building controller 402 can be configured to assign the input two levels. If the effect the input will have on the output is quadratic, building controller 402 may assign the input three levels. In this regard, a continuous input, such as TES tank size, may be represented as two or three discrete tank sizes, a small size, a medium size, and a large size. If an input only have two possible inputs, such as B1 404 which may be to either make a purchase of a variable speed drive or not to make a purchase of a variable speed drive, building controller 402 can be configured to assign two levels to the input since the input is a binary input.

In some embodiments, building controller 402 generates output Y1 410 based on inputs B1 404, C1 406, and C2 408 and the various levels for each input assigned by building controller 402. Input B1 404 is shown to include two levels, a low level and a high level. Input B1 404 may be a binary input, that is, an input which has two levels, a high level and a low level, an on state and an off state. Similar to input B1 404, input C1 406 is shown to have two levels. However, input C1 406 may not be a binary input, but may rather be a continuous input. A continuous input may be an input which has more than two input states and/or is continuous rather than discrete. For example, input C1 406 may contain all values from 0 to 10. However, building controller 402 may characterize input C1 406 as an input with two discrete values if building controller 402 determines that output Y1 410 has a linear response to input C1 406. Input C1 406 may have a linear response if Y1 410 has a linear relationship to input C1 406. Because building controller 402 may characterize input C1 406 as a linear input, building controller 402 may assign two distinct levels to input C1, a low level and a high level. In some embodiments, the low level of input C1 406 may correspond to a particular value of possible C1 406 values (e.g., 2 in a range of inputs between 0 and 10) while the high level of input C1 406 may correspond to a particular value of possible C1 406 values (e.g., 8 in a range of inputs between 0 and 10).

C2 408 may be a continuous input characterized by building controller 402 as having three distinct levels, a low level, a medium level, and a high level. Building controller 402 can be configured to determine if input C2 408 has a quadratic response. A quadratic response may mean that input C2 408 causes output Y1 410 to respond in a quadratic manner to input values of C2 408. Building controller 402 can be configured to assign the low level, the medium level, and the high level of input C2 408 to distinct levels (e.g., 2, 5, and 8 if C2 408 has a range of inputs from 0-10) in response to determining that output Y1 410 has a quadratic response to input C2 408.

Building controller 402 is shown to generate output Y1 410. Building controller 402 can generate output Y1 410 based on inputs B1 404, C1 406, and C2 408. Further, building controller 402 can generate output Y1 410 based on the various levels and combinations of the levels of inputs B1 404, C1 406, and C2 408. Output Y1 410 generated by building controller 402 is shown to include 12 distinct values. In this regard, the number of outputs generated by building controller 402 from inputs B1 404, C1 406, and C2 408 is finite.

Using the combination of levels of the inputs allows building controller 402 to perform a limited and non-exhaustive analysis of inputs B1 404, C1 406, and C2 408 to generate output Y1 410. For example, the two levels of B1 404, C1 406, and the three levels of C2 408 allow for twelve possible combinations of inputs and thus twelve values for output Y1 410 (e.g., 3*2*2=12). However, if input C1 406 and C2 408 were not given distinct and limited levels, the number of values for output Y1 410, and hence the number of calculations necessary to generate output Y1 410, may exponentially increase. For example, if the two levels of C1 406 and the three levels of C2 408 are both taken from a range of 0-10, the number of outputs for Y1 410 would be 200 (i.e., 10*10*2=200).

Building controller 402 can be configured to generate a model for Y1 410 based on the twelve values of output Y1 410. In various embodiments, the model may be generated based on a regression and/or any other analysis technique. The result of the regression may be a model which represents the output Y1 410 as a function of input B1 404, C1 406, and C2 408. Building controller 402 can be configured to perform various types of regression such as linear regression, multiple linear regression (MLR), logistic regression, polynomial regression, stepwise regression, etc. Building controller 402 can be configured to utilize MLR to create a linear model of a non-linear system (e.g., inputs B1 404, C1 406, C2 408, and output Y1 410) by using least squares fitting.

Building controller 402 can be configured to generate output Y1 420 by using MLR. For example, building controller 402 can be configured to generate the following equation to represent Y1 410. In some embodiments, generating the equation below involves determining values for and a with least squares fitting which result in the smallest amount of error between the input x, and the output $\hat{Y}$. In the following equation, $\hat{Y}$ may represent Y1 420, β may represent a vector of constants generated by the MLR, x may represent a vector of predictor variables (e.g., inputs B1 404, C1 406, C2 408) while a may be a constant generated by the MLR.

$$\hat{Y} = \beta x + a \qquad \text{Equation 1}$$

In some embodiments, x, the value representing a vector of the predictor variables, may be an equation of predictor variables. For example, the following equation represents a particular predictor variable, $x_1$, as a function of two predictor variables, $x_{B1}$ and $x_{C1}$ which may be inputs B1 404 and input C1 406.

$$x_1 = (x_{B1})(x_{C1}) \qquad \text{Equation 2}$$

In some embodiments, the model for output Y1 410 can be analyzed by building controller 402 to determine if the model is accurate. In some embodiments, the building controller 402 can be configured to generate and use a statistical p-value to determine if the model for output Y1 420 is accurate. In various embodiments, building controller 402 can be configured to generate and use a coefficient of variation root mean squared error (CVRMSE) value to determine if the model for output Y1 420 is accurate. Building controller 402 can determine the statistical p-value and the CVRMSE value to determine if the model for output Y1 410 in terms of inputs B1 404, C1 406, and C2 408 is accurate. If the statistical p-value indicates that some of the inputs to the model for output Y1 410 are not significant, building controller 402 can be configured to discard the insignificant input and re-generate the model for output Y1 410. Similarly, building controller 402 can be configured to determine the CVRMSE value to determine the accuracy of the fit of the model for output Y1 410. In response to determining that the model for output Y1 410 is not accurate, building controller 402 can be configured to identify new inputs for the model and re-generate the model for output Y1 420 based on the additional inputs.

The following equation shows a relationship which building controller 402 can be configured to utilize to determine a CVRMSE value for a model for output Y1 420, wherein RMSE is root mean squared error and y is the mean of the output of the model for output Y1 420.

$$CVRMSE = \frac{RMSE}{\bar{y}} \qquad \text{Equation 3}$$

Referring now to FIG. 5, table 500 illustrating the various combination of the levels of input B1 404, input C1 406, and input C2 408 that generate outputs Y1 410 are shown, according to an exemplary embodiment. Table 500 illustrates the twelve possible combinations of inputs B1 404, input C1 406, and input C2 408. Even through C1 406 and C2 408 may have possible inputs exponentially greater than two and three levels and/or even an infinite number of possible inputs, building controller 402 can still generate output values (i.e., Y1 410) which can be used to model output Y1 410 is terms of the levels that building controller 402 can be configured to define for input B1 404, input C1 406 and input C2 408.

In this regard, a model for inputs in which some inputs have an infinite number of possible levels can be generated. Further, the number of calculations are reduced proportionally to the number of combinations. In this regard, building controller 402 can generate output Y1 410 and/or a model for output Y1 410 faster than an exhaustive calculation approach (e.g., a brute force approach). This may result in faster computing times and less energy consumption as compared to the exhaustive calculation approaches.

Figure 6:
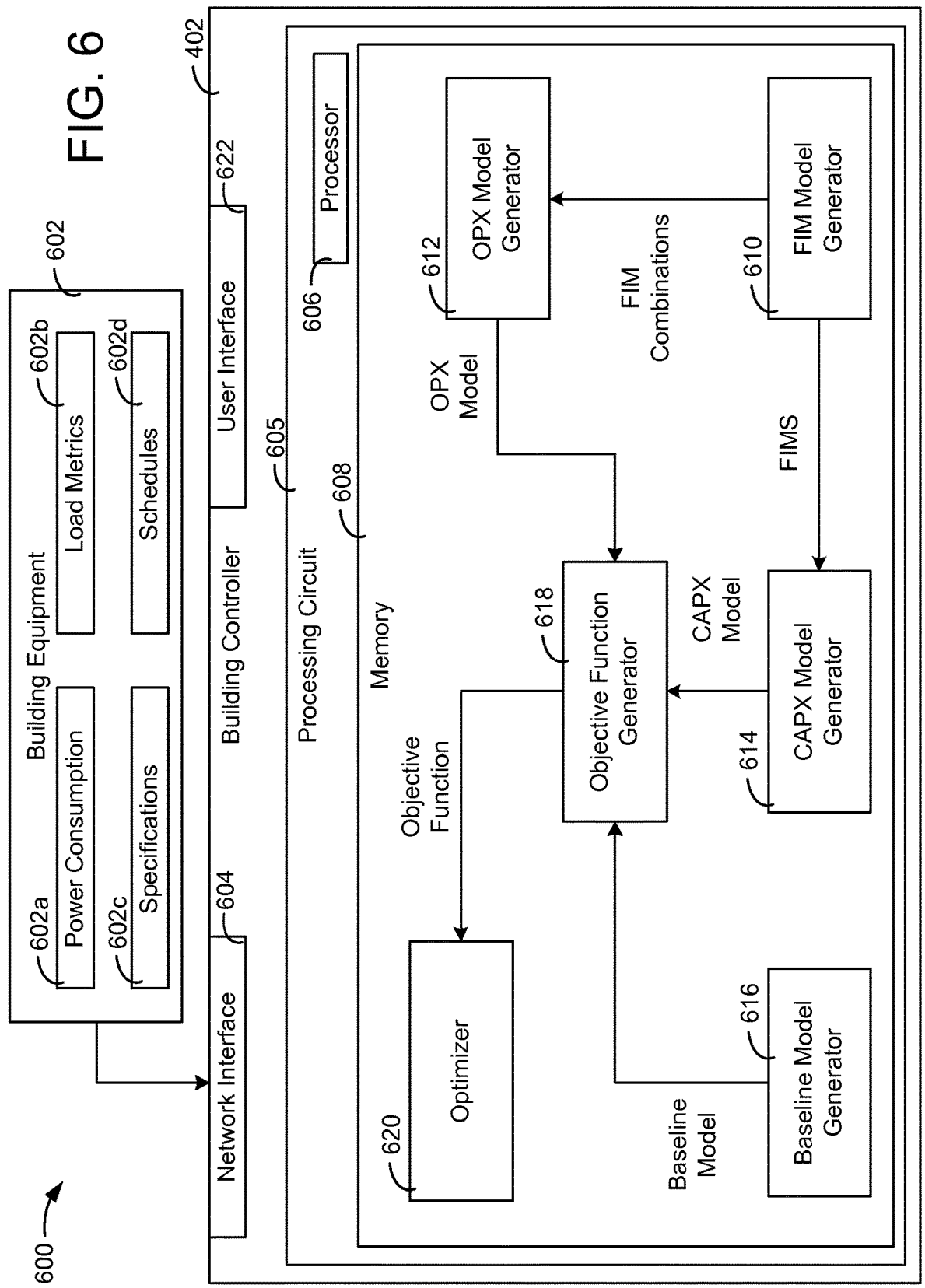
FIG. 6 is a block diagram of the building controller of FIG. 4 in greater detail, according to an exemplary embodiment.

Referring now to FIG. 6, a block diagram of a building management system (BMS) 600 is shown, according to an exemplary embodiment. In some embodiments, BMS 600 is configured to monitor and control building equipment 602 in an online operational environment. For example, BMS 600 can include a METASYS® building management system, a VERASYS® building management system, a central plant optimization system, an energy optimization system, and/or other types of online systems configured to perform real-time control of building equipment 602. In other embodiments, BMS 600 can be implemented as an offline planning tool configured to simulate the operation of a building or central plant over a predetermined time period (e.g., a day, a month, a week, a year, etc.) for planning, budgeting, and/or design considerations. For example, BMS 600 may use building loads and utility rates to determine an optimal allocation of energy resources across building equipment 602 to minimize cost over a simulation period. However, BMS 600 may not be responsible for real-time control of building equipment 602. Throughout this disclosure, the term "building management system" is used to describe both the online implementation and the offline implementation.

In FIG. 6, building controller 402 is shown in greater detail. Building controller 402 is shown to communicate with building equipment 602. Building equipment 602 may be and/or include the various equipment described with reference to FIGS. 1-3 (e.g., heaters, chillers, air handling units, pumps, fans, thermal energy storage, etc.) that can be configured to effect environmental changes in a building (e.g., building 10). For example, building equipment 602 may be and/or include boiler 104, chiller 102, AHU 106, VAV unit 116, subplants 202-212, various thermostats, sensors, controllers (e.g., controllers similar to building controller 402), and/or any other computing device and/or HVAC device and/or controller. Building controller 402 can be configured to receive data from building equipment 602 and provide control signals to building equipment 602. In some embodiments, building controller 402 operates building equipment 602 to affect a variable state or condition within the building.

Building equipment 602 may store data indicative of various metrics of building equipment 602 and/or other equipment coupled to building equipment 602. In this regard, the data stored by building equipment 602 may be used to determine an operating cost of a particular piece of building equipment and/or a building (e.g., building 10) as a whole. Data such as power consumption 602a, load metrics 602b (e.g., hot loads, cold loads, etc.), specifications 602c, and schedules 602d (e.g., dispatch schedules) can be used to generate the operating cost of the particular piece of building equipment and/or the building or facility as a whole. Building equipment 602 may be configured to communicate data 602a-602d to building controller 402 automatically, periodically, or based on a request and/or query from building controller 402.

Building controller 402 is shown to include network interface 604 and processing circuit 605. Building controller 402 can be configured to receive data 602a-602d from building equipment 602. Further, building controller 402 can be configured to query building equipment 602 for data 602a-602d. In various embodiments, network interface 604 connects building controller 402 to various building and non-building networks. In this regard, network interface 604 may include various transmitters, network components, connectors, etc. In some embodiments, building controller 402 is configured to store data 602a-602d in memory (e.g., memory 608. In this regard, building controller 402 may not be configured to retrieve and/or receive some and/or all of data 602a-602d from building equipment 602.

Network interface 604 may allow building controller 402 to communicate with various devices, systems, and servers of system 200. Network interface 604 may allow building controller 402 to communicate with various components of building 10 and/or building equipment 602. In some embodiments, network interface 604 may allow building controller 402 to communicate with a Wi-Fi network, a wired Ethernet network, a Zigbee network, a Bluetooth network, and/or any other wireless network. Network interface 604 may allow building controller 402 to communicate via a local area network or a wide area network (e.g., the Internet, a building WAN, etc.) that may use a variety of communications protocols (e.g., BACnet, IP, LON, etc.). In some embodiments, network interface 604 may allow building controller 402 to communicate via RS485 communication, RS232 communication, USB communication, fire wire communication, and/or any other communication type.

Processing circuit 605 is shown to include processor 606 and memory 608. Processor 606 can be a general purpose or specific purpose processor, an application specific integrated circuit (ASIC), one or more field programmable gate arrays (FPGAs), a group of processing components, or other suitable processing components. Processor 606 may be configured to execute computer code and/or instructions stored in memory 608 or received from other computer readable media (e.g., CDROM, network storage, a remote server, etc.).

Memory 608 can include one or more devices (e.g., memory units, memory devices, storage devices, etc.) for storing data and/or computer code for completing and/or facilitating the various processes described in the present disclosure. Memory 608 can include random access memory (RAM), read-only memory (ROM), hard drive storage, temporary storage, non-volatile memory, flash memory, optical memory, or any other suitable memory for storing software objects and/or computer instructions. Memory 608 can include database components, object code components, script components, or any other type of information structure for supporting the various activities and information structures described in the present disclosure. Memory 608 can be communicably connected to processor 606 via processing circuit 605 and can include computer code for executing (e.g., by processor 606) one or more processes described herein.

Memory 608 is shown to include FIM model generator 610. FIM model generator 610 can be configured to identify one or more facility improvement measures (FIMS) and generate a model based on the FIMS. A FIM may be any improvement that can be made to a facility (e.g., building 10). A non-exhaustive list of FIMS may be purchasing a building controller for a facility, upgrading a tank size of a chiller, purchasing a variable frequency drive (VFD) for a compressor, etc. These FIMS may increase or decrease the performance of the facility. Further, each upgrade and/or purchase may cost a predefined amount.

FIM model generator 610 can determine one or more levels (e.g., sizes) for each FIM. Further, FIM model generator 610 can determine an exhaustive list of combinations of each FIM and each FIM level. An example of FIM levels would be that purchasing a piece of equipment or not purchasing a piece of equipment. This FIM would have two levels, purchase the equipment or do not purchase equipment. However, a FIM such as a chiller may have an large and/or infinite number of chiller sizes. FIM model generator 610 can be configured to select a finite number of levels for the chiller size. FIM model generator 610 can be configured to characterize each FIM as a binary input, a linear continuous input, a quadratic continuous input, etc. In some embodiments, the FIMS may be inputs such as input B1 404, input C1 406, and input C2 408. In this regard, FIM model generator 610 can be configured to select one or more levels for each FIM and generate FIM combinations, an exhaustive number of combinations for each level of each FIM. The FIM combinations can be understood with reference to FIG. 5 which illustrates a table of exhaustive combinations of levels of input B1 404, C1 406, and C2 408 and/or FIG. 9 which illustrates combinations of FIM levels.

FIM model generator 610 may provide the FIM combinations to an operational expense (OPX) model generator 612 and the selected FIMS to a capital expense (CAPX) model generator 614. OPX model generator 612 can be configured to generate an OPX model. OPX model generator 612 may generate the OPX model based on the FIM combinations received from FIM model generator 610. In this regard, OPX model generator 612 may be configured to predict an operating cost for each combination of FIM levels (described in greater detail with reference to FIG. 7). OPX model generator 612 can be configured to generate the OPX model by performing a regression (e.g., a multi-linear regression) on the operating expenses of each combination of FIM levels. For example, the equation below illustrates a potential model which FIM model generator 610 can be configured to generate. The OPX model below (Equation 4) illustrates the predicted operating expense $\hat{Y}_{OPX}$ for FIMS which include $X_{Tank}$ representing tank sizes of a TES, $X_{Chiller}$ represents sizes for a chiller, $X_{Year}$ represents years so that load growth can be incorporated into the model and utility price escalation, while $\beta_0$-$\beta_7$ represent constants generated by the regression:

$$\hat{Y}_{OPX} = \beta_0 + \beta_1 X_{Tank} + \beta_2 (X_{Tank})^2 + \beta_3 X_{Chiller} + \beta_4 (X_{Chiller})^2 + \beta_5 X_{Year} + \beta_6 (X_{Year})^2 + \beta_7 (X_{Year})(X_{Chiller}) \quad \text{Equation 4}$$

Generating an OPX model with OPX model generator 612 (e.g., Equation 4) based on selected combinations of levels of FIMS may be faster than exhaustively generating the OPX model based on an exhaustive number of combinations of each FIM. However, even though the OPX model is generated based on the selected levels of combinations of the FIMS, the OPX model represents any and all possible FIM level (e.g., continuous inputs that have not been converted into discrete multi-level inputs).

The OPX model can be generated from a discrete number of possible combinations. For example, the FIMS, tank, chiller, and year in Equation 4 may each be represented by discrete levels that when exhaustively combined, may have a discrete number of operating costs. The tank FIM may have three possible sizes, the chiller FIM may have 3 possible sizes, while the year may also have three possible sizes. The exhaustive combination of FIMS and FIM levels may be 27 since 3*3*3=27. A discrete operating cost may be generated by OPX model generator 612 for each of the 27 levels. By taking the 27 discrete operating costs and performing a regression on the operating costs, an OPX model, such as Equation 4, can be generated. The OPX model may represent operating expense costs of FIMS beyond the 27 possible combinations. For example, the tank, chiller, and year may have an infinite number of possible sizes within a predefined ranges, that is, they are continuous. This extrapolation and interpolation of operating costs facilitated by the regression and represented by the OPX model that OPX model generator 612 can be configured to generate can represent any possible size or level for each FIM and is not limited to the discrete levels selected for each FIM that are used to generate the OPX model.

In some embodiments, OPX model generator 612 can be configured to determine if inputs to an OPX model generated by OPX model generator 612 need to be added and/or removed. In this regard, OPX model generator 612 can be configured analyze the OPX model and determine metrics for the quality of the model. OPX model generator 612 can be configured to determine a statistical p-value for each input to the OPX model and a CVRMSE value for the model. In response to determining that the statistical p-value indicates that one or more inputs to the OPX model are insignificant (e.g., less significant than a predefined amount), OPX model generator 612 can be configured to remove the input from the OPX model and generate a new OPX model. Further, in response to determining that the CVRMSE value is above a predefined amount, OPX model generator 612 can be configured to determine that more inputs need to be incorporated into the OPX model and a new OPX model should be generated based on one or more additional inputs. By generating an OPX model and then iteratively updating the OPX model, OPX model generator 612 can be configured to iteratively improve the quality of the OPX model until various metrics (e.g., a statistical p-value and a CVRMSE value) indicate that the OPX model is acceptable.

CAPX model generator 614 can be configured to generate a capital expense (CAPX) model. The CAPX model may represent a capital expense and/or an initial cost of a particular FIM. For example, buying a particular piece of equipment (e.g., a variable speed drive for a compressor) used in a building or facility may have a flat cost (e.g., $100, $500, $1k etc.) associated with the purchase (e.g., the cost of purchasing the equipment). In various embodiments, a continuous input such as a size of a TES may have a cost proportional to and/or otherwise a function of the size of the TES. In this regard, CAPX model generator 614 can be configured to store and/or retrieve a price and/or price function representative of a particular FIM. The equation below illustrates the general form for the CAPX model that may be generated by CAPX model generator 614. The CAPX model may be understood as a summation of all the cost functions of all the FIMS and in this regard, CAPX model generator 614 can be configured to sum all of the cost functions of all the FIMS to generate the CAPX model. In the equation below, $C_{CAPX}$ represents the capital expense and/or the CAPX model, n represents the number of FIMS, while $f_i(X_i)$ represents the cost function for each FIM:

$$C_{CAPX} = \sum_{i=1}^{n} f_i(X_i) \qquad \text{Equation 5}$$

An example of a CAPX model is the equation below. In the equation below, three FIMS were being considered and as such, the CAPX model, $C_{CAPX}$, is the summation of three terms. In the example, three FIMS are being considered which are a TES tank, a chiller, and a variable speed drive upgrade to a compressor. $C_{Tank}$ represents the cost of a tank proportional to the size of the tank while $X_{Tank}$ represents the size of the tank. C Chiller represents the cost of the chiller proportional to the size of the chiller while C Chiller represents the size of the chiller. Finally, $C_{VSD}$, represents the price of the variable speed drive for the compressor. It is being assumed that the variable speed drive has a flat price, that is, it is being considered as a binary input to the CAPX model.

$$C_{CAPX} = C_{Tank}X_{Tank} + C_{Chiller}X_{Chiller} + C_{VSD} \qquad \text{Equation 6}$$

Baseline model generator 616 can be configured to generate a baseline model. In some embodiments, the baseline model represents an operating cost of a building (e.g., building 10) in its current state, that is, without any FIMS. In this regard, baseline model generator 616 can be configured to communicate with building equipment 602 via network interface 604 and retrieve information regarding building equipment 602 (e.g., power consumption 602a, load metrics 602b, specifications 602c, schedules 602d). Based on power consumption 602a, load metrics 602b, specifications 602c, and schedules 602d, baseline model generator 616 can be configured to determine a predicted operating cost of the building or facility. Baseline model generator 616 can be configured to further generate the baseline model based on hot loads and cold loads of various equipment of a building and/or a building, electrical consumption of the equipment and/or the building or facility, the effect which weather (e.g., predicted weather) has on the efficiency of the building equipment, utility rates, etc. In some embodiments, baseline model generator 616 can be configured store and utilize various equipment and building models to generate the baseline model. These equipment and building models, in combination with power consumption 602a, load metrics 602b, specifications 602c, and/or schedules 602d, and various other variables can be used to predict the power consumption of a piece of equipment and/or the building or facility over a time period (e.g., one month, one year, etc.). The predicted power consumption can be used in combination with utility rates to determine the cost of operating the building or facility. Various examples of using building and equipment models to determine an operating cost (e.g., the functions performed by baseline model generator) can be found in U.S. patent application Ser. No. 14/634,609 filed Feb. 27, 2015, the entirety of which is incorporated by reference herein.

Baseline model generator 616 can be configured to generate power consumption of a piece of equipment and/or the building or facility based on the power consumption of the equipment and/or building or facility at one or more points in time. Baseline model generator 616 can be configured to generate the baseline model based on the one or more data points representing the operating cost of the building or facility at the discrete points in time. Baseline model generator 616 can be configured to generate the baseline model by performing a regression (e.g., MLR) on the data points.

Baseline model generator 616 can be configured to generate the baseline model to be accurate to the operating cost of the building or facility to a predefined amount (e.g., matches annual operation within +/−5% and/or monthly operating cost within +/−7%). The following equation represents a baseline model. $\hat{Y}_{Baseline}$ represents the baseline model, $\beta_0$-$\beta_2$ represent constants generated by baseline model generator 616, and Year represents a year after a starting time (e.g., 1 year, 2 years, etc.) after the baseline model is generated:

$$\hat{Y}_{Baseline}=\beta_0\beta_1(\text{Year})+\beta_2(\text{Year})^2 \qquad \text{Equation 7}$$

Objective function generator 618 can be configured to generate an objective function. Objective function generator 618 can be configured to generate the objective function based on the baseline model received from the baseline model received from baseline model generator 616, the CAPX model received from CAPX model generator 614, and/or the OPX model received from OPX model generator 612. In various embodiments, objective function generator 618 can be configured to use one or more models which relate the baseline model, the CAPX model, and/or the OPX model to a predefined variable. The predefined variable may be an internal rate of return (IRR), a net present value (NPV), and/or any other metric.

In some embodiments, the CAPX model, the OPX model, and the baseline are terms in a model representing NPV. The equation below represents NPV where NPV is the net present value, $C_0$ is an initial expenditure, $C_t$ are cashflows, and r is a discount rate applied to all future cashflows and T is the lifespan.

$$NPV = -C_0 + \sum_{t=1}^{T} \frac{C_t}{(1+r)^t} \qquad \text{Equation 8}$$

Objective function generator 618 can be configured to utilize equation 8 in terms of the CAPX model, the OPX model, and the baseline model. Objective function generator 618 can be configured to perform the following substitutions into equation 8.

$$C_0 = C_{CAPX} \qquad \text{Equations 9–11}$$
$$C_t = \hat{Y}_{Baseline,t} - \hat{Y}_{OPX,t}$$
$$NPV = -C_{CAPX} + \sum_{t=1}^{T} \frac{\hat{Y}_{Baseline,t} - \hat{Y}_{OPX,t}}{(1+r)^t}$$

Optimizer 620 can be configured to optimize the objective function. In this regard, optimize 620 can be configured to use the objective function to determine optimal FIMS. Optimizer is shown to be configured to receive the objective function from objective function generator 618. In some embodiments, the optimizer may maximize and/or minimize a particular parameter and/or parameters of the objective function. In this regard, optimizer 620 can be configured to determine optimal FIMS (e.g., an optimal TES tank size, an optimal chiller size, etc.). In various embodiments, the optimizer identifiers optimal FIMS that will optimize a NPV, an IRR, and/or any other metric. In some embodiments, optimizer 620 uses various constraints when performing the optimization. For example, optimizer 620 can be configured to use a maximum and/or minimum equipment size and/or capacity (e.g., equipment size of a FIM) and/or a maximum and/or minimum payback period when optimizing the objective function. In some embodiments, optimizer 620 can be configured to user mixed integer linear programming (MILP) to optimize the objective function (e.g., maximize, minimize, or otherwise optimize, IRR and NPV). Further, optimizer 620 can be configured to use a branch and bound algorithm to optimize the objective function.

In some embodiments, optimizer 620 can be configured to modify and/or update the baseline model, the OPX model, the CAPX model, and/or the objective function before identifying the optimal FIMS. For example, in some embodiments, optimizer 620 may implement various investment constraints. For example, a particular FIM may have a minimum capital expense cost. In this regard, optimizer 620 can be configured to update the CAPX model and/or the objective function based on the following relationship, where $f_i(X_i')$ is the cost function for a particular FIM (i.e., the FIM indexed) while $C_{min}$ is the minimum capital expense cost.

$$\sum_{i=1}^{n} f_i'(X_i') \geq C_{min} \qquad \text{Equation 12}$$

Because each FIM is represented by one or more discrete levels, optimizer 620 can be configured to perform a discrete normalization on a data set. The equation for the normalization is below where X' is the normalized data set, $X_{min}$ is the minimum data point of the data set, $X_{max}$ is the maximum data point of the data set, a is the lower bound of the normalization, b is the maximum value of the normalization, while X is the data set before being normalized. Since the design levels are discrete and non-continuous, optimizer 620 can be configured to perform a discrete normalization on each data set. The equation for doing this is shown below.

$$X' = a + \frac{(X - X_{min})(b - a)}{(X_{max} - X_{min})} \qquad \text{Equation 13}$$

In some embodiments, optimizer 620 can be configured to determine b by finding the greatest common divisor of the range of available FIM levels. In addition to scaling the input values for the FIMS, optimizer 620 can be configured to adjust the CAPX model. The equation for adjusting the CAPX model is shown below where $f_i(X_i)$ is the cost function for a particular FIM while $f'_i(X'_i)$ is the adjusted cost function.

$$\sum_{i=1}^{n} f_i(X_i) = \sum_{i=1}^{n} f_i'(X_i') \qquad \text{Equation 14}$$

Optimizer 620 can be configured to generate the following equation and use the equation to optimize the objective function. Based on the normalized predictor variables generated by optimizer 620 via the normalization, optimizer 620 can be configured to update the OPX model. In this regard, a regression (e.g., multi-linear regression) may be performed to update the OPX model.

$$f'(X') = C\left(\frac{(X' - a)(X_{max} - X_{min})}{(b - a)} + X_{min}\right) \qquad \text{Equation 15}$$

Building controller 402 is shown to include user interface 622. User interface 622 may be a touch screen display configured to receive input from a user and display images and text to a user. In some embodiments, user interface 622 is at least one or a combination of a resistive touch screen and a capacitive touch screen (e.g., projective capacitive touch screen). In some embodiments, user interface 622 is a monitor, a keyboard, a mouse, and/or any other device which may be coupled and/or remotely connected to building controller 402 that is configured to display output from and receive input for building controller 402.

User interface 622 can be configured to allow a user to view various results generated by the various components of memory 608 (e.g., the OPX model, the FIM combinations, the FIMS, the baseline model, the objective function, the results of optimizer 620, etc.). In this regard, user interface 622 can be configured to display information such as table 900 as described with reference to FIG. 9, plots 1002 and 1004 as described with reference to FIG. 10, and plots 1102 as described with reference to FIG. 11. Further, user interface 622 can receive various inputs from user interface 622 regarding the various models generated. For example, user interface 622 may allow a user to enter, select, and/or manually generate a baseline model, the FIM combinations, the FIMS, form various combinations between the baseline model and the FIM combinations and/or FIMS, the CAPX model, various cost functions for the FIMS, response types for FIMS (e.g., binary, linear, quadratic, etc.), FIM levels, etc. Further, user interface 622 can allow a user to change and/or various models (e.g., FIM combinations, OPX model, FIMS, CAPX model, objective function, baseline model) without building controller 402 having to regenerate the models. The user interface 622 can be configured to allow a user to manually select and/or override which variables are significant in the OPX model. The user interface 622 can be configured to allow a user to substitute one FIM for another, add or remove FIMS, etc.

Figure 7:
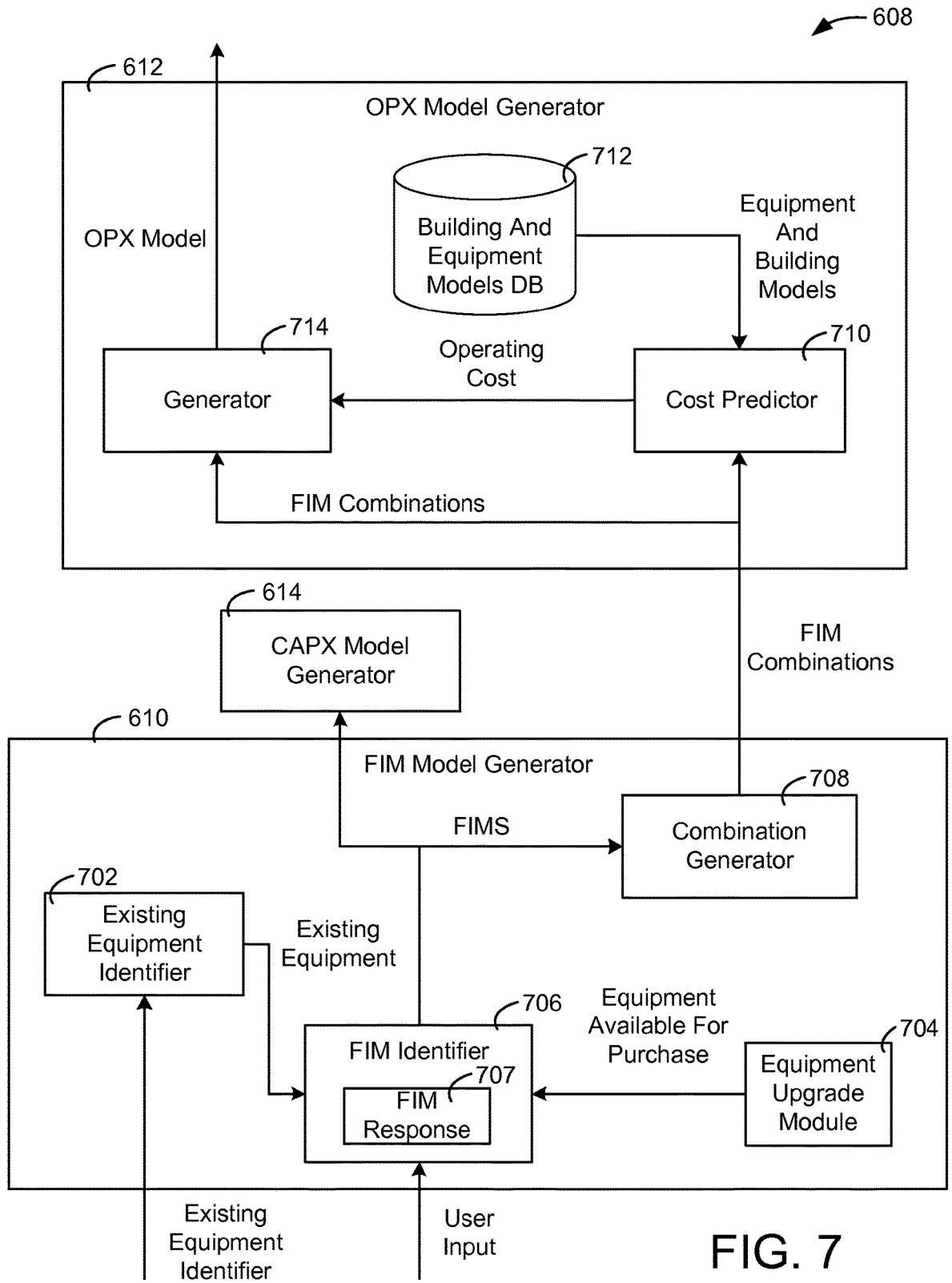
FIG. 7 is a block diagram of components of the building controller of FIG. 4 and FIG. 6 in greater detail, according to an exemplary embodiment.

Referring now to FIG. 7, various components of memory 608 are shown in greater detail, according to an exemplary embodiment. In FIG. 7, OPX model generator 612, CAPX model generator 614, and FIM model generator 610 are shown as described with reference to FIG. 6. FIM model generator 610 is shown to generate FIMS and FIM combinations. FIM model generator 610 is shown to be configured to provide the FIMS to CAPX model generator 614 and the FIM combinations to OPX model generator 612.

FIM model generator 610 is shown to include existing equipment identifier 702, equipment upgrade module 704, FIM identifier 706, and combination generator 708. Existing equipment identifier 702 can be configured to communicate with building equipment 602. In this regard, existing equipment identifier 702 can be configured to determine what existing equipment is in a particular building or facility (e.g., building 10). Existing equipment identifier 702 can be configured to receive various identifiers from building equipment 602 which existing equipment identifier 702 can be configured to use to identify existing equipment. In various embodiments, existing equipment identifier 702 may communicate to a database and/or retrieve a list that may be stored by building controller 402 to determine the existing equipment. Existing equipment identifier 702 can be configured to communicate an indication of the existing equipment to FIM identifier 706.

Equipment upgrade module 704 can be configured to store and/or maintain a data structure (e.g., a list) identifying equipment upgrades. In this regard, equipment upgrade module 704 may communicate with a network (e.g., the Internet) via network interface 604. In some embodiments, equipment upgrade module 704 can be configured to communicate with various servers and/or equipment manufacturers and/or entities selling equipment to determine if there are equipment upgrades for pieces of equipment identified by existing equipment identifier 702 and/or if building 10 can utilize the purchase of a new piece of equipment. Equipment upgrade module 704 is shown to communicate various indications of equipment and/or equipment upgrades that are available for purchase to FIM identifier 706.

FIM identifier 706 can be configured to generate, identify, and/or select one or more FIMS. FIM identifier can be configured to provide the FIMS to CAPX model generator 614 and combination generator 708. FIM identifier 706 can be configured to receive user input, an indication of existing equipment, and an indication of equipment that is available for purchase. FIM identifier 706 may determine a set of FIMS based on the user input, the indication of existing equipment, and the indication of equipment that is available for purchase. In some embodiments, FIM identifier 706 can be configured to receive one or more requested FIMS via user input. In this regard, a user may identify a specific FIM that they are interested (e.g., a particular building equipment purchase, purchase and/or upgrade of a chiller, etc.).

In addition to determining one or more FIMS, FIM identifier 706 can be configured to select one or more levels for the identified FIMS. In this regard, FIM identifier 706 can be configured to determine if the response of a particular FIM is binary, linear, and/or quadratic. The response of a particular FIM may be the relationship between the FIM and the operating cost model. In this regard, FIM identifier 706 may store a response (e.g., binary, linear, and/or quadratic) in FIM response 707. FIM response 707 may store a response type for various system upgrades. For example, the purchase and/or upgrade of a particular chiller may be a quadratic response while the purchase and/or upgrade of TES may always be linear. FIM identifier 706 can be configured to use the existing equipment indication and the equipment available for upgrade and/or purchase with the FIM response 707 to determine if the FIMS need to be binary, quadratic, or linear. In some embodiments, FIM identifier 706 may be coupled to user interface 622. In this regard, a user may manually select whether a particular is binary, linear, and/or quadratic via user interface 622 which FIM identifier 706 can be configured to receive and implement.

If FIM identifier 706 determines that a FIM is binary, it may assign the FIM two distinct levels (e.g., Low and High). If FIM identifier 706 determines that a FIM is linear, it may assign two distinct FIM levels (Low and High). In response to determining that a FIM is linear, FIM identifier can be configured to determine two levels for the linear FIM. FIM identifier 706 can be configured to use a FIM size range to determine a high level and a low level for the linear FIM. In some embodiments, FIM identifier 706 can be configured to set the high level as an upper half FIM average of the FIM size range and the lower level as a lower half FIM average of the FIM size range. In some embodiments, if the FIM is a new purchase, FIM identifier 706 can be configured to use the largest possible FIM purchase size and the smallest possible FIM purchase size to determine the FIM size range. In some embodiments, if the FIM is an upgrade to and/or a replacement of existing building equipment, FIM identifier 706 can be configured to determine the FIM size range with the current FIM size and the largest possible FIM size.

In response to determining that a FIM is quadratic, FIM identifier can be configured to determine three levels for the quadratic FIM. FIM identifier 706 can be configured to use a FIM size range to determine a high level, a medium level, and a low level for the quadratic FIM. In some embodiments, FIM identifier 706 can be configured to set the high level as an upper half FIM average of the FIM size range, the medium level as the average of the FIM size range, and the low level as a lower half FIM average of the FIM size range. In some embodiments, if the FIM is a new purchase, FIM identifier 706 can be configured to use the largest possible FIM purchase size and the smallest possible FIM purchase size as the FIM size range. In some embodiments, if the FIM is an upgrade to and/or a replacement of existing building equipment, FIM identifier 706 can be configured to use the current FIM size and the largest possible FIM size as the size range.

In various embodiments, the FIM size ranges can be set and/or adjusted via user input (e.g., user interface 622). In some embodiments, a user may indicate what a maximum size is and/or a minimum size for a FIM. Further, a user may be able to manually select a FIM level (e.g., low level, medium level, and high level) directly via user interface 622.

Combination generator 708 can be configured to generate combinations of each FIM and each FIM level. In this regard, FIM combination generator 708 can be configured to exhaustively generate the combinations for each FIM and each FIM level. An example of the result of FIM combinations generated by combination generator 708 is shown in FIG. 5 or table 900 as described with reference to FIG. 9. In FIG. 5, each possible combination of levels for input B1 404, C1 406, and C2 408 is identified. Combination generator 708 can be configured to generate a data structure, FIM combinations, which includes each combination of each FIM. For example, if there are three FIMS and each FIM has two levels, combination generator 708 will generate six FIM level combinations (e.g., 2*2*2=6). In another case, if there are three FIMS and one FIM has two levels and two FIMS each have three levels, combination generator 708 would generate 18 FIM level combinations (e.g., 2*3*3=18). Combination generator 708 can be configured to provide cost predictor 710 and generator 714 the FIM combinations it generates.

OPX model generator 612 is shown to include cost predictor 710, building and equipment models database 712, and generator 714. Cost predictor 710 is shown to receive the FIM combinations generated by combination generator 708. Cost predictor 710 can be configured to predict an operating cost for each FIM combination. Cost predictor 710 can be configured to use various equipment and/or building models to predict the operating cost of each FIM combination. In some embodiments, the building and/or equipment models are retrieved and/or received from building and equipment models database 712. Further, cost predictor 710 may use various weather predictions and utility costs to predict the operating cost. Cost predictor 710 can be configured to provide the operating cost of each FIM to generator 714. An example of the operating costs may be the output values of Y1 410 (i.e., value 1-value 12) shown in FIG. 5. Values 1-12 represent an output value of Y1 410 for each combination of inputs B1 404, C1 406, and C2 408. Further, an example of the operating costs may be operating costs 908 of table 900 as described with further reference to FIG. 9. In FIG. 9, table 900 shows operating cost 908 for each combination of tank size 902, year 904, and chiller size 906.

Various examples of using building and equipment models to determine an operating cost (e.g., the functions performed by cost predictor 710 and building and equipment models database 712) can be found in U.S. patent application Ser. No. 14/634,609 filed Feb. 27, 2015. In some embodiments, cost predictor 710 can be configured to determine one or more optimal setpoints and/or operating settings for building equipment 602 based on the building models, the equipment models, energy consumption predictions, etc. These setpoints and settings may result in energy efficiency, lower run times, etc. for building equipment that is installed and operating in a building or facility. The operating cost generated by cost predictor 710 may be highly accurate (e.g., accurate to a predefined amount) since the operating cost predicted by cost predictor 710 may be based on building or equipment models that are specific to a particular building. The OPX model generated by generator 714 may be highly accurate (e.g., accurate to a predefined amount) since the operating costs received from cost predictor 710 may be highly accurate. Cost predictor 710 can be configured to predict an energy consumption amount for a building and/or building equipment (e.g., building equipment 602) and determine an operating cost by multiplying the energy consumption amount by an energy cost. The energy cost may be the cost of a utility (e.g., electricity, water, gas, etc.).

In addition to generating the OPX model and the operating cost based on building and equipment models, baseline model generator 616, as described with reference to FIG. 6, can be configured to generate the baseline model based on the equipment and building models. For example, the baseline model may be highly accurate (e.g., accurate above a predefined amount) since the baseline model may be generated based on building models, equipment models, and building equipment energy efficient setpoints and operating settings, etc. Similar to cost predictor 710, baseline model generator 616 can be configured to determine a predicted energy amount for building equipment and/or a building based on the building models, the equipment models, optimal setpoints and equipment settings, etc. This predicted energy amount may be multiplied by an energy cost of a particular utility (e.g., electricity, water, gas, etc.).

Still referring to FIG. 7, generator 714 can be configured to generate the OPX model. Generator 714 can be configured to generate the OPX model based on the FIM combinations received from combination generator 708 and the operating cost for each FIM combination received from cost predictor 710. The OPX model can be an equation similar to the OPX model described in Equation 4. The different FIM levels or the various possible sizes or values for the FIMS may be the dependent variables in the OPX model while the predicted operating cost of the OPX model may be the dependent variable. In various embodiments, generator 714 can be configured to perform a regression (e.g., an MLR) on the FIM combinations and the operating costs to determine the OPX model.

Figure 8:
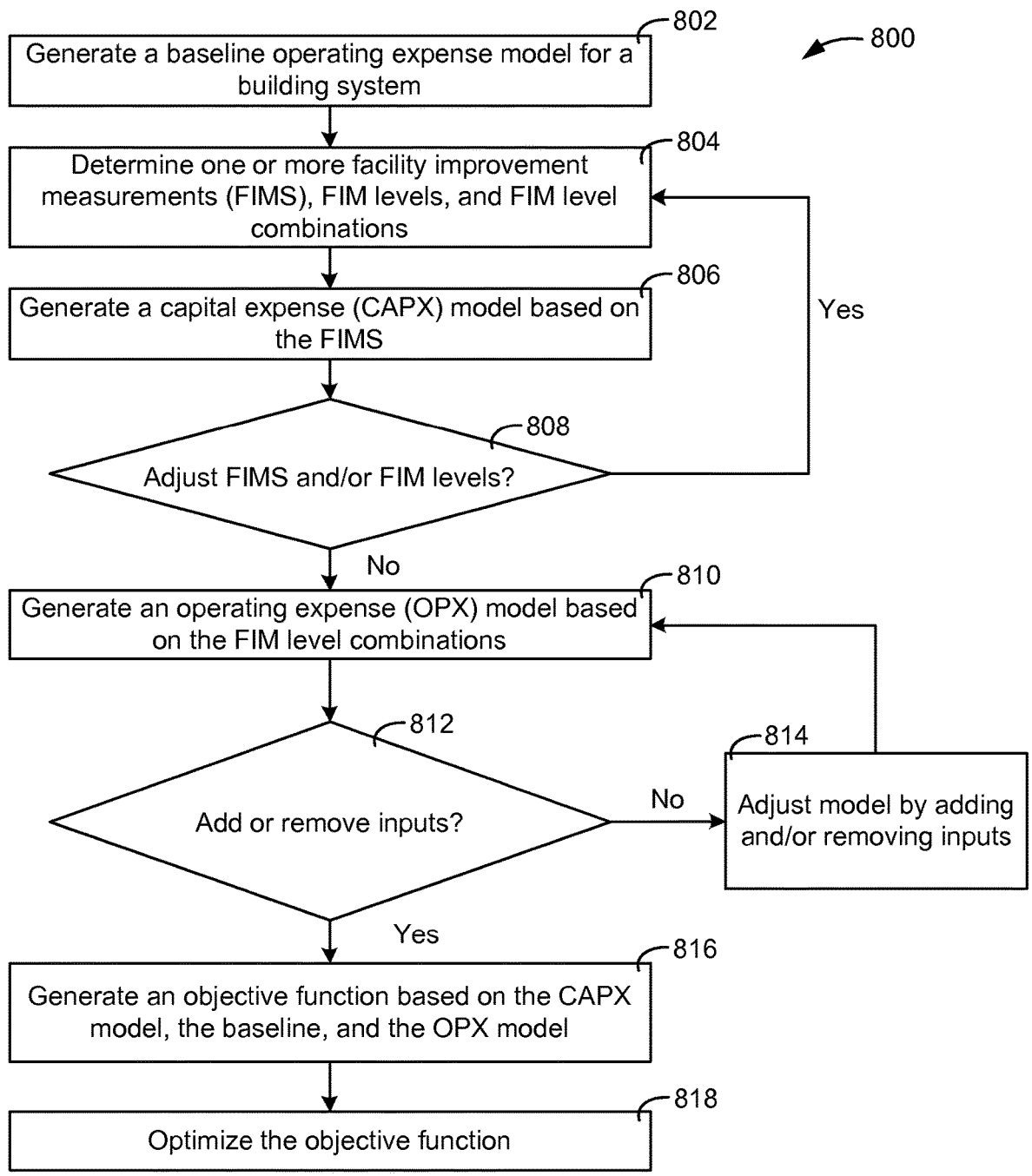
FIG. 8 is a flow diagram of a process for using design of experiments to determine optimal FIMS with the building controller of FIGS. 4 and 6-7, according to an exemplary embodiment.

Referring now to FIG. 8, a process 800 for using design of experiments to determine optimal facility improvements, according to an exemplary embodiment. Building controller 402 can be configured to perform process 800. Further, the various components of building controller 402 can be configured to perform each and/or some of the steps of process 800. In step 802, baseline model generator 616 can generate a baseline model. Baseline model generator 616 may retrieve information regarding equipment in a building. In this regard, baseline model generator 616 can retrieve power consumption 602a, load metrics 602b, specifications 602c, and/or schedules 602d. Based on power consumption 602a, load metrics 602b, specifications 602c, and schedules 602d, baseline model generator 616, various equipment and building models, utility rates, and/or weather data (e.g., weather predictions), baseline model generator 616 can determine a prediction of the power consumption of a piece of equipment, equipment in a building, and/or the building over a time period (e.g., one month, one year, etc.). In some embodiments, baseline model generator 616 can determine the power consumption of a building and/or piece of equipment at one or more discrete points (e.g., data points representing energy consumption and/or operating costs) in time and perform a regression on the data points to determine the baseline model.

In step 804, FIM model generator 610, or components of FIM model generator 610, such as FIM identifier 706, can determine one or more FIMS and/or levels for each FIM. FIM identifier 706 can receive user input via user interface 622 such as an indication of existing equipment in a building, can retrieve an indication of existing equipment and/or equipment that is available for purchase and/or via the Internet, based on a data structure stored by FIM model generator 61, and/or by communicating with building equipment (e.g., equipment 602). FIM identifier 706 can determine one or more FIMS based on the indication of existing equipment and/or the indication of equipment that is available for purchase and/or upgrade.

In step 804, FIM identifier 706 can determine one or more levels for the FIMS. FIM identifier 706 may determine a response (e.g., binary, linear, and/or quadratic) for each FIM. FIM identifier 706 can use the existing equipment indication and/or equipment available for upgrade and/or purchase to determine if each FIM has a binary, quadratic, or linear response. In some embodiments, FIM identifier 706 can determine the response based on an indication of the response for each FIM stored by FIM identifier 706 and/or based on user input via user interface 622. If FIM identifier 706 determines that a FIM is binary, it may assign the FIM two distinct levels (e.g., Low and High). If FIM identifier 706 determines that a FIM is linear, it may assign two distinct FIM levels (e.g., Low and High). Further, if FIM identifier 706 determines that a FIM is quadratic, it may assign the FIM three distinct FIM levels (e.g., Low, Medium, and High). In step 804, combination generator 708 can generate combinations of each FIM and each FIM level based on the FIMS and FIM levels identified by FIM identifier 706. In this regard, FIM combination generator 708 can exhaustively generate combinations of each FIM, and each FIM level.

In step 806, CAPX model generator 614 can generate a CAPX model based on the FIMS determined in step 804. The CAPX model may represent a capital expense and/or an initial cost of a particular FIM and/or a combination of all the FIMS. CAPX model generator 614 may store and/or retrieve a price and/or price function representative of a particular FIM and sum the cost functions of all the FIMS identified by CAPX model generator 614 to generate the CAPX model.

In step 808, FIM model generator 610 can adjust the FIMS, the FIM levels, and the FIM combinations. In this regard, FIM model generator 610 present the FIMS, the FIM levels, and/or the FIM level combinations to a user via user interface 622, and/or any other method for communicating to a user. This may allow the user to review the FIMS, the FIM levels, and/or the FIM level combinations and make various changes to the FIMS. For example, a user may want to add a FIM, remove a FIM, change the levels of a FIM if the user believes a FIM is linear rather than quadratic as identified by FIM model generator 610, etc. If the FIMS and/or FIM levels are adjusted, the process returns to step 804. In this regard, steps 804 and 806 are performed to generate new FIM level combinations and/or a new capital expense model based on the adjustments to the FIMS and/or the FIM levels as in step 808.

In step 810, OPX model generator 612 can generate an operating expense model based on the FIM level combinations. OPX model generator 612 may determine an operating cost for each combination of FIM levels. In some embodiments, OPX model generator 612 generates the OPX model based on a regression of the operating expenses of each combination of FIM levels. In some embodiments, cost predictor 710 determines the operating cost for each FIM combination based on various equipment models, building models, weather predictions, utility rates, etc. Generator 714 can generate the OPX model based on the FIM combinations determined in step 804 and the operating cost for each FIM combination determined by cost predictor 710. In various embodiments, generator 714 can perform a regression (e.g., an MLR) on the FIM combinations and the operating cost for each FIM combination to determine the OPX model.

In step 812, OPX model generator 612 can determine if inputs to the OPX model need to be added and/or removed. In this regard, OPX model generator 612 can analyze the OPX model. In some embodiments, OPX model generator 612 determines a statistical p-value for each input to the OPX model. If the statistical p-value indicates that one or more inputs to the OPX model are insignificant (e.g., less significant than a predefined amount), OPX model generator 612 can perform step 814. In some embodiments, OPX model generator 612 can determine if the fit of the OPX model is appropriate by calculating a CVRMSE value for the model. If the CVRMSE value calculated is above a predefined amount, OPX model generator 612 may determine that more inputs need to be incorporated into the OPX model and process 800 may advance to step 814.

In step 814, OPX model generator 612 can remove the insignificant inputs from the OPX model as determined by the statistical p-values. Further, OPX model generator 612 can add one or more inputs to the FIM model which may not have been originally considered based on the CVRMSE value. Process 800 can continue to step 810 where the OPX model is generated. In this regard, steps 810, 812, and 814 may be performed iteratively to generate an OPX model in which each input to the OPX model is significant to a predefined amount and the CVRMSE value for the OPX model is below a predefined amount.

In step 816, objective function generator 618 can generate an objective function based on the OPX model, the CAPX model, and/or the baseline model. In some embodiments, the objective function generated by objective function generator 618 is a NPV function wherein objective function generator 618 uses the OPX model, the CAPX model, and the baseline model as inputs to the NPV function. For example, Equation 9 represents the NPV function while equations 10 and 11 represent the substitution into Equation 9 that objective function generator 618 can perform. The difference between the baseline model and the OPX model may indicate the savings and/or economic benefit to the FIMS (Equation 11). Equation 12 represents the NPV function generated by objective function generator 618 in terms of the CAPX model, the OPX model, and the baseline.

$$NPV = -C_0 + \sum_{t=1}^{T} \frac{C_t}{(1+r)^t}$$

$$C_0 = C_{CAPX}$$

$$C_t = \hat{Y}_{Baseline,t} - \hat{Y}_{OPX,t}$$

Equations 9–12

$$NPV = -C_{CAPX} + \sum_{t=1}^{T} \frac{\hat{Y}_{Baseline,t} - \hat{Y}_{OPX,t}}{(1+r)^t}$$

In step 818, optimizer 620 can be configured to optimize the objective function. Optimizer 620 may maximize and/or minimize a particular parameter and/or parameters of the objective function. In this regard, optimizer 620 determines optimal FIMS for a building and/or facility. In various embodiments, the optimizer 620 determines FIMS that maximize and/or minimize a NPV, an IRR, and/or any other metric. In step 818, optimizer 620 may use various constraints when performing the optimization such as a maximum and/or minimum equipment size and/or capacity (e.g., equipment size of a FIM) and/or a maximum and/or minimum payback period. In some embodiments, optimizer 620 uses various methods to optimize the objective function such as mixed integer linear programming.

Referring now to FIG. 9, a table 900 of FIMS, FIM levels, FIM combinations, and an operating cost for each FIM combination is shown, according to an exemplary embodiment. Building controller 402 can be configured to generate the FIMS, FIM levels, and FIM combinations shown in table 900. In table 900, three FIMS are shown. The FIMS are tank size 902 (e.g., tank size for TES), year 904 (e.g., the time after upgrading a FIM), and chiller size 906. The three FIMS may be FIMS that are determined by FIM model generator 610 and/or FIM identifier 706. As can be seen, each FIM has three levels, small, medium, and large. This indicates that each FIM is assumed to be quadratic by FIM identifier 706. FIM identifier 706 can be configured to determine the response for each FIM and in this example, has determined and/or has been instructed that tank size 902, year 904, and chiller size 906 should be modeled as quadratic.

Operating cost 908 illustrates the operating cost of each FIM level combination. For example, for a small tank size 902, a small year 904, and a small chiller size 906, the operating cost 908 is $9,000,280. However, for a medium tank size 902, a large year 904, and a medium chiller size 906 the operating cost is $13,825,434. Twenty seven separate operating costs 908 are shown for the twenty seven FIM level combinations shown in table 900 (i.e., 3*3*3=27).

In some embodiments, the operating cost 908 for each FIM level combination can be determined by OPX model generator 612. From this data, operating cost 908, OPX model generator 612 can be configured to generate the OPX model. In various embodiments, OPX model generator 612 can perform a regression with the operating cost 908 (e.g., linear regression, multi-linear regression, etc.).

Figure 10:
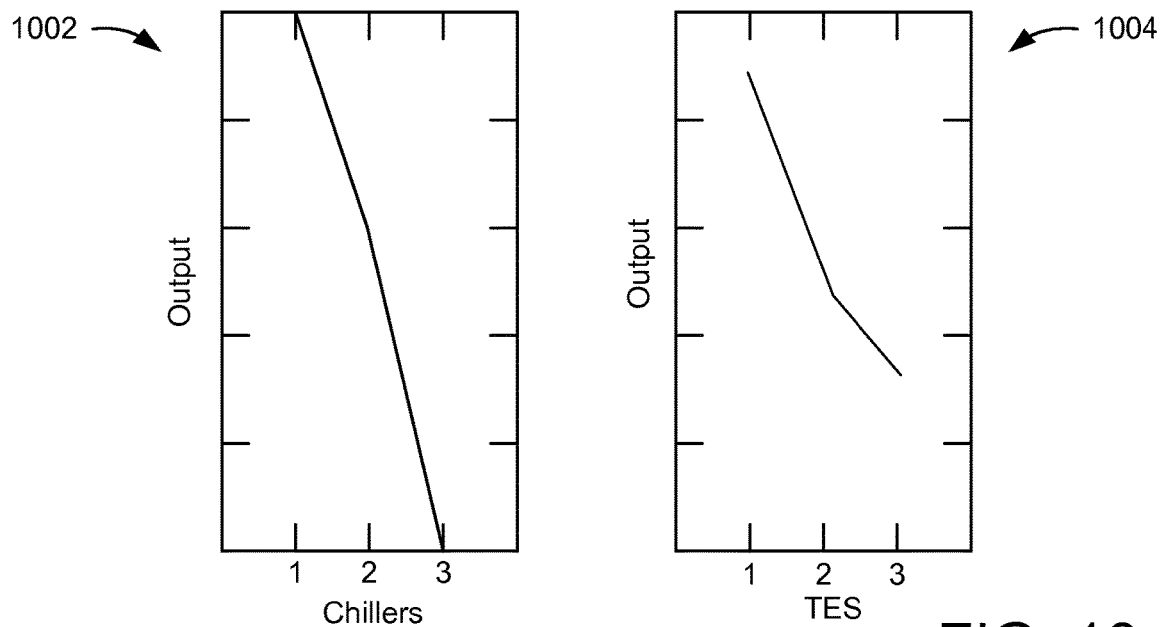
FIG. 10 is a set of two plots which illustrate the effect of an input on an output where the input has predefined levels, according to an exemplary embodiment.

Referring now to FIG. 10, two interaction plots, 1002 and 1004 are shown, according to an exemplary embodiment. In plot 1002, the output (e.g., operating cost) is shown with respect to a single input, chillers. In this case, three sizes are being considered for the chiller, size 1, size 2, and size 3. Plot 1004 shows the same output isolated with respect to TES size. Three sizes for the TES are shown. The three levels being considered for the TES size are level 1, level 2, and level 3.

Based on the slope of the graphs in plots 1002 and 1004, the effect that chiller size and TES size have on the output can be seen. A low slope may indicate that an input (e.g., chiller size or TES size) has a low effect on the output while a higher slope may indicate the input may have a greater effect on the output. In this regard, building controller 402 can be configured to generate plots (e.g., plots 1002 and 1004) which illustrate the effect which various inputs may have on an output. Building controller 402 can be configured to cause user interface 622 and/or terminal screen to display the various plots so that a user may select and/or otherwise understand the effect which input size and/or level has on an output.

Figure 11:
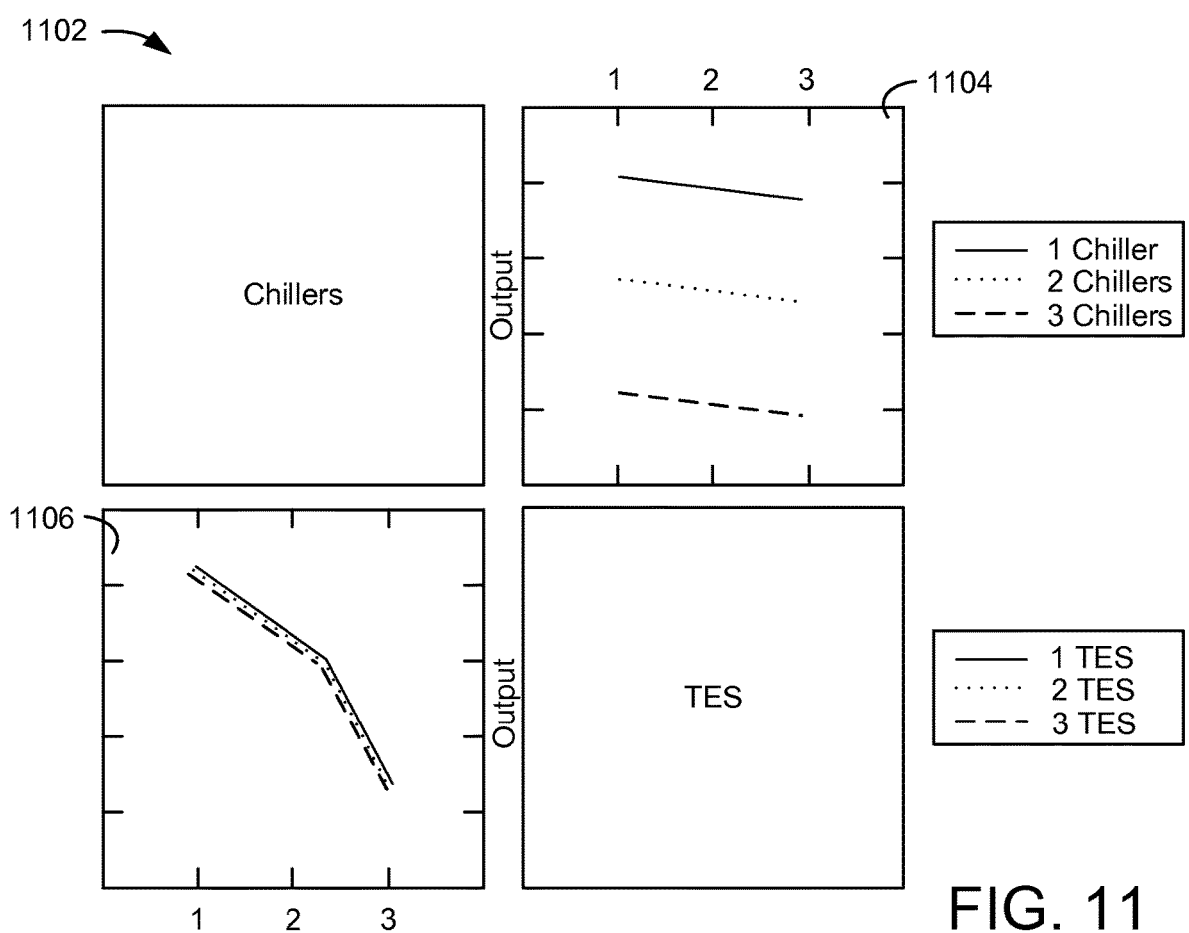
FIG. 11 is an interactions plot illustrating an effect which combinations of inputs may have on an output, according to an exemplary embodiment.

Referring now to FIG. 11, plots 1102 are shown to illustrate the interactions between two inputs, according to an exemplary embodiment. Plots 1102 indicate whether the combination of one or more variables enhance or degrade the output and/or allow a system and/or user to identify which inputs are necessary for properly modeling a system. Plots 1102 may illustrate the effect which one input has on a second input. Plot 1104 illustrates the relationship between the output and three sizes of a TES and three sizes for a chiller. The chiller sizes, indicated by the solid, dotted, and dashed lines in plot 1104 are all relatively parallel. The more parallel the lines, the less effect the inputs have on each other. Because the lines are relatively parallel, it can be assumed that the effect between the TES size and the chiller size is mild. Similarly, in plot 1106, the TES sizes, represented by the solid, dotted, and dashed lines, are shown with respect to chiller sizes. Again, the lines in plot 1106 are parallel. Building controller 402 can be configured to generate plots 1104 and 1106 to visually illustrate the effect which various inputs in combination may have on a single output. Building controller 402 can be configured to cause user interface 622 and/or terminal screen to display the plots 1102 so that a user may select and/or otherwise understand the effect which inputs have on each other.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   building equipment operable to affect an environmental condition of a building; and
   a controller configured to:
      identify one or more facility improvement measures (FIMS), each of the FIMS representing a potential upgrade or addition to the building equipment;
      perform a design of experiments analysis to determine a plurality of discrete combinations of the FIMS, each discrete combination comprising one or more of the FIMS and a discrete level for each FIM in the combination;
      generate an operating expense model by determining an operating cost for each discrete combination of the FIMS and performing a regression using the operating costs, wherein the operating expense model is a continuous model that predicts operating cost as a function of a continuous input representing a level of a FIM between or beyond the discrete levels;
      generate an objective function comprising the operating expense model and a capital expense model, wherein the objective function indicates an economic value as a function of the FIMS and quantifies a cost of energy consumption, wherein adjusting the level of the FIM decreases the operating cost defined by the operating expense model while increasing a capital cost defined by the capital expense model; and
      optimize the objective function to determine an optimal combination of the FIMS to make a modification to the building equipment.

2. The system of claim 1, wherein the combinations of the FIMS determined by the controller comprise each possible combination of each FIM and each FIM level;
   wherein the controller is configured to select one or more levels for each FIM based on an output response of the FIM.

3. The system of claim 1, wherein the controller is configured to:
   determine an output response for each FIM, wherein the output response indicates a type of relationship between the FIM and an operating cost resulting from the FIM;
   select two distinct levels for a particular FIM in response to determining that the output response of the particular FIM is binary;
   select two distinct levels for the particular FIM in response to determining that the output response of the particular FIM is linear; and
   select three distinct levels for the particular FIM in response to determining that the output response of the particular FIM is quadratic.

4. The system of claim 1, wherein the controller is configured to generate a baseline model based on information associated with the building equipment, wherein the baseline model represents an operating cost of the building equipment prior to implementing the FIMS.

5. The system of claim 1, wherein the controller is configured generate the objective function based on the operating expense model of the FIMS, wherein the operating expense model represents the operating cost of the FIMS;
   wherein the controller is configured to generate the operating expense model by determining an operating cost for each combination of the FIMS and performing a regression with the operating costs.

6. The system of claim 1, wherein the controller is configured to generate the operating expense model for each of the combinations of the FIMS, wherein the operating expense model indicates a cost of operating the building equipment after implementing the FIMS.

7. The system of claim 6, wherein the controller is configured to:
   generate a baseline model that indicates a cost of operating the building equipment prior to implementing the FIMS; and
   determine a benefit of each of the combinations of the FIMS based on a difference between the cost indicated by the baseline model and the cost indicated by the operating expense model.

8. The system of claim 1, wherein the controller is configured to:
   determine a capital expense function for each of the FIMS; and
   generate the capital expense model by summing each of the capital expense functions, wherein the capital expense model represents a purchase cost of the FIMS.

9. The system of claim 1, wherein the objective function is a net present value (NPV) function and wherein a difference between a baseline model and the operating expense model and the capital expense model are arguments in the NPV function;
   wherein the controller is configured to optimize the NPV function to identify FIMS which result in an optimal NPV or internal rate of return (IRR).

10. A method for optimizing upgrades to building equipment in a building management system, the method comprising:
   identifying one or more facility improvement measures (FIMS), each of the FIMS representing a potential upgrade or addition to the building equipment and at least one of the FIMS including two or more levels that correspond to different sizes of the building equipment resulting from the potential upgrade or addition, wherein the building equipment is operable to affect an environmental condition of a building;
performing a design of experiments analysis to determine a plurality of combinations of the FIMS, each combination comprising one or more of the FIMS and a level for each FIM in the combination;
generating an objective function based on the combinations of the FIMS, wherein the objective function comprises an operating expense model and a capital expense model and indicates an economic value as a function of the FIMS and quantifies a cost of energy consumption, wherein adjusting the level of the FIM decreases an operating cost defined by the operating expense model while increasing a capital cost defined by the capital expense model; and
optimizing the objective function to determine an optimal combination of the FIMS to make a modification to the building equipment.

11. The method of claim 10, wherein the combinations of the FIMS comprise each possible combination of each FIM and each FIM level;
wherein the method further comprises selecting one or more levels for each FIM based on an output response of the FIM.

12. The method of claim 11, the method further comprising:
determining an output response for each FIM, wherein the output response indicates a type of relationship between the FIM and an operating cost resulting from the FIMS;
selecting two distinct levels for a particular FIM in response to determining that the output response of the FIM is binary;
selecting two distinct levels for the particular FIM in response to determining that the output response of the FIM is linear; and
selecting three distinct levels for the particular FIM in response to determining that the output response of the FIM is quadratic.

13. The method of claim 10, further comprising generating a baseline model based on information associated with the building equipment, wherein the baseline model represents an operating cost of the building equipment prior to implementing the FIMS.

14. The method of claim 10,
wherein the method further comprises generating the operating expense model by determining an operating cost for each combination of the FIMS and performing a regression with the operating costs.

15. The method of claim 10, further comprising:
generating a baseline model that predicts a cost of operating the building equipment prior to implementing the FIMS; and
determining a benefit of each of the combinations of the FIMS based on a difference between the cost predicted by the baseline model and the operating cost predicted by the operating expense model.

16. The method of claim 10,
wherein the method further comprises generating the capital expense model by determining a capital expense function for each of the combinations of the FIMS and summing each of the capital expense functions.

17. The method of claim 10, wherein the objective function is a net present value (NPV) function and wherein a difference between a baseline model and the operating expense model and the capital expense model are arguments in the NPV function;
wherein the method further comprises optimizing the NPV function to identify FIMS which result in an optimal NPV or internal rate of return (IRR).

18. A building management system comprising:
building equipment operable to affect an environmental condition of a building; and
a controller configured to:
identify one or more facility improvement measures (FIMS), each of the FIMS representing a potential upgrade or addition to the building equipment;
perform a design of experiments analysis to determine a plurality of discrete combinations of the FIMS, the discrete combinations of the FIMS comprising each possible combination of the FIMS and a discrete level for each FIM in the combination;
determine an output response for each FIM, wherein the output response indicates a type of relationship between the FIM and an operating cost resulting from the FIM;
select the one or more levels for each FIM in the combinations based on the output response;
generate a baseline model that predicts a cost of operating the building equipment prior to implementing any of the FIMS;
generate an operating expense model by determining an operating cost for each discrete combination of the FIMS and performing a regression using the operating costs, wherein the operating expense model is a continuous model that predicts operating cost as a function of a continuous input representing a level of a FIM between or beyond the discrete levels;
generate a capital expense model, wherein the capital expense model represents a purchase cost of the FIMS;
generate an objective function comprising the baseline model, the operating expense model, and the capital expense model, wherein adjusting the level of the FIM decreases the operating cost defined by the operating expense model while increasing the purchase cost defined by the capital expense model, wherein the objective function indicates an economic value as a function of the FIMS, a cost of energy consumption predicted to result from the FIMS, and the purchase cost; and
optimize the objective function to determine an optimal combination of the FIMS to make a modification to the building equipment.

19. The system of claim 18, wherein the controller is configured to:
select two distinct levels for a particular FIM in the combination in response to determining that the output response of the FIM is binary;
select two distinct levels for the particular FIM in the combination in response to determining that the output response of the FIM is linear; and
select three distinct levels for the particular FIM in the combination in response to determining that the output response of the FIM is quadratic.

* * * * *